C. J. LAKE.
FLYING MACHINE.
APPLICATION FILED DEC. 20, 1909.

1,010,644.

Patented Dec. 5, 1911.
3 SHEETS—SHEET 1.

WITNESSES:

INVENTOR
Christopher J. Lake,
BY
ATTORNEY

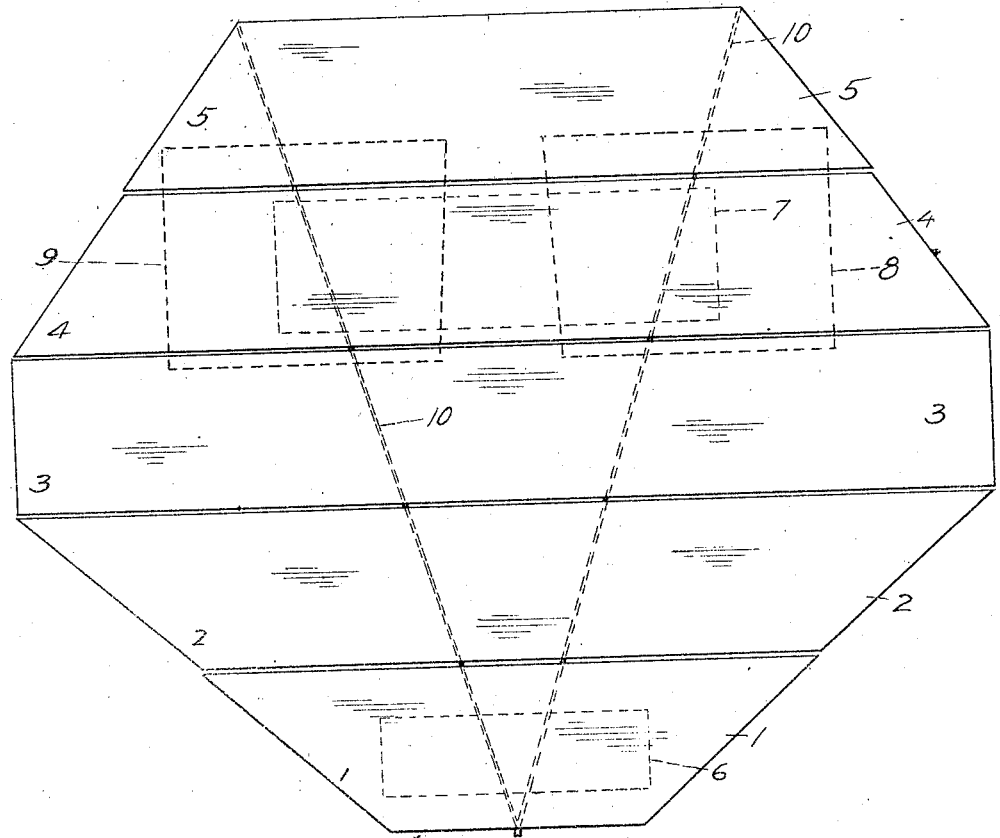

UNITED STATES PATENT OFFICE.

CHRISTOPHER J. LAKE, OF BRIDGEPORT, CONNECTICUT.

FLYING-MACHINE.

1,010,644.

Specification of Letters Patent.

Patented Dec. 5, 1911.

Application filed December 20, 1909. Serial No. 534,074.

*To all whom it may concern:*

Be it known that I, CHRISTOPHER J. LAKE, a citizen of the United States, and resident of Bridgeport, in the county of Fairfield and State of Connecticut, have invented certain new and useful Improvements in Flying-Machines, of which the following is a specification.

This invention relates to flying machines and has for its object to provide an arrangement of lifting surfaces that will carry the most weight with the greatest steadiness of flight, and to provide suitable structure for securing and supporting the surfaces.

A further object is to provide means for maintaining the equipoise of the machine and for causing it to ascend or descend as desired.

A further object is to provide means for adapting the lower portion of the machine to skim over the surface of water or glide on the air as desired and to alight on and rise from the water.

Figure 1:
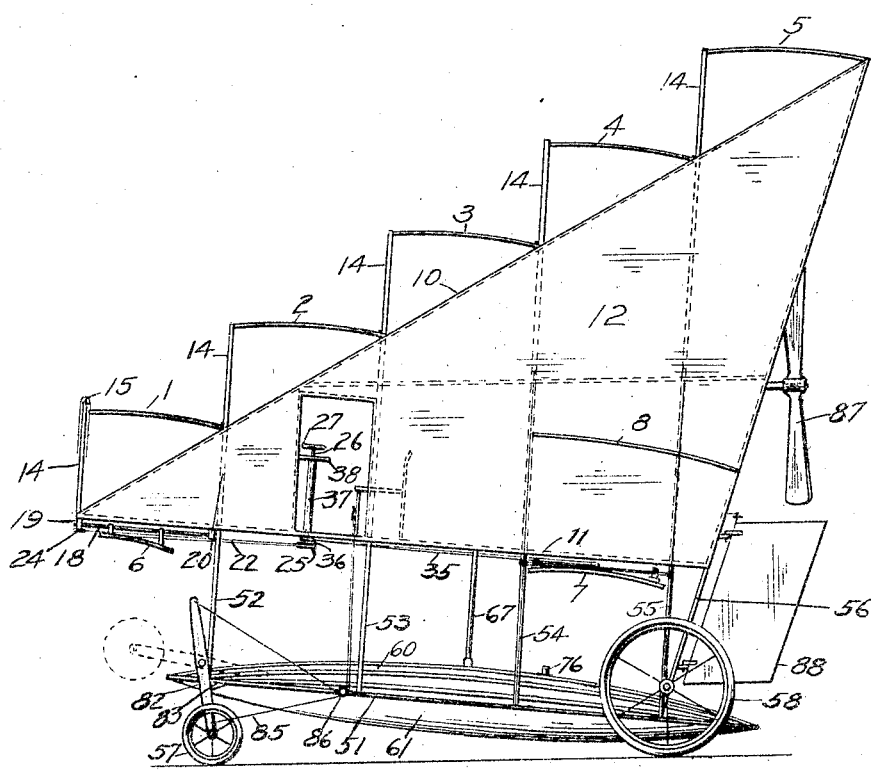
Figure 10:
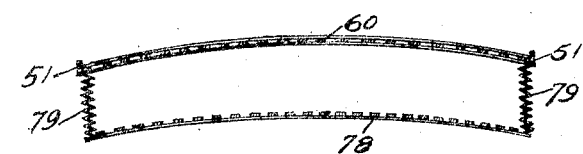
Figure 2:
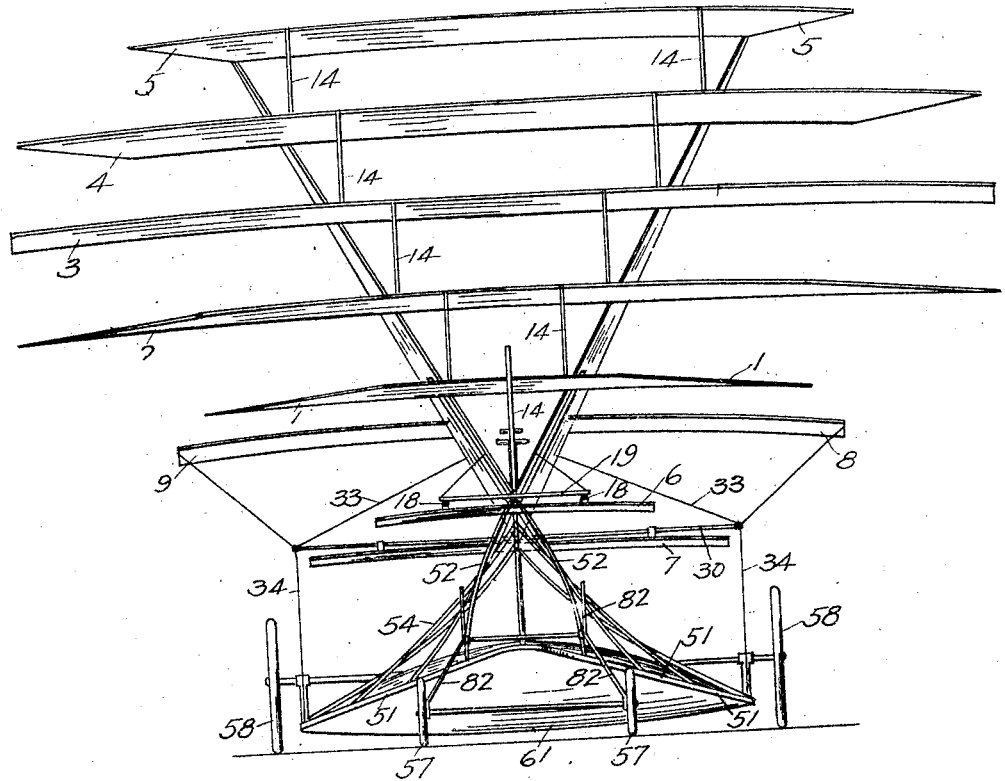
Figure 4:
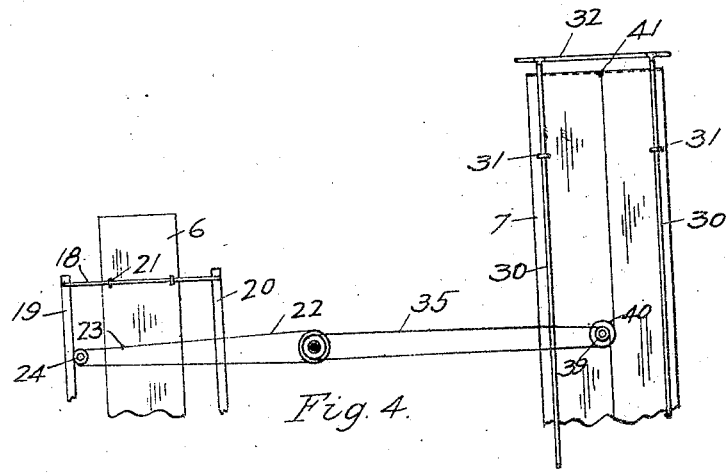

With these objects in view and other objects that will appear I have embodied my invention in the form illustrated by the accompanying drawings which form a part of this specification and in which, Figure 1 is a side elevation; Fig. 2 is a front view; Fig. 3 is a top view; Fig. 4 is a detail diagram of plane-shifting means; Fig. 5 is a diagram of distending and collapsing means; Figs. 6, 7, 8, and 9 are details of Fig. 5, and Fig. 10 is a cross-sectional detail showing an alternate construction of the distensible element shown in Figs. 1 and 2.

Referring to Figs. 1, 2 and 3, the principal lifting surfaces of the machine are designated 1, 2, 3, 4, and 5 and are arranged, one after the other, in a gradient series ascending toward the rear. In Figs. 2 and 3 it is shown that the transverse dimensions of the surfaces increase from the front to a maximum at about the mid-portion of the machine and thence diminish toward the rear, the foremost surface 1 having somewhat less lateral spread than the rearmost 5. This arrangement of surfaces I have found to insure the greatest steadiness of flight with the maximum lift. These surfaces are mounted on the inclined upper members 10 of a pair of triangular fabric-covered truss frames which are joined together along their lower edges 11 and form the substantial central or body portion of the machine. The formation of this body and the relation and manner of connection to it of the other parts of the machine are similar to that shown in my pending applications for United States Letters Patent Nos. 484,299 and 512,054, filed March 18, 1909, and August 9, 1909, respectively. Each of the surfaces 1 to 5 is secured by its rear edge to the truss member 10 and the front edge is supported and fixed in position by upright members 14, the front surface 1 being hingeably mounted on the member 10 and having its angle of inclination under control of the operator by means of a cable attached to its front edge and passing over a pulley 15 at the top of the upright member 14.

Extending laterally from the sides of the body trusses there is a pair of surfaces 8 and 9 placed at sufficient distance from the other surfaces to insure their efficient action. These add greatly to the amount of lifting surface of the machine while adding but little to the weight, since the body portion is well adapted to carry additional surfaces projecting from its sides without additional framing structure for supporting them. Two or more pairs of such surfaces may be so mounted on the sides of the body if desired.

The extremities of the various transverse surfaces are provided with guy wires connecting them to the upper and lower portions of the machine to prevent any upward deflection of the surfaces from the pressure of the air when in flight. These guy wires, however, have been, for the most part, omitted to avoid confusion on the drawings. The surfaces 1 to 5 may also be trussed together to secure additional strength, the rear edge of any of these surfaces, except 5, being connected to the front edge of the surface immediately above it by vertical struts with diagonal wiring between them.

Numerals 6 and 7 represent lifting surfaces mounted on slides or guides beneath the trussed body 12, surface 6 being in the front portion of the machine and surface 7 being near the rear. For surface 6 a pair of longitudinal slide rods 18 are secured between the ends of cross members 19 and 20 (Fig. 4) rigidly fixed to the under side of the body. The back or upper side of surface 6 is provided with rings or loops 21 on each side adapted to slide on the rods 18. In this way the surface is supported by the slide rods in a manner to admit of its displacement toward or from the center of gravity of the machine. To control the position of the surface an endless cable 22 is attached to it as indicated at 23 (Fig. 4) and passed around a forward pulley 24 and a drum 25. The drum is mounted on a shaft 26 provided with a hand-wheel 27 (Fig. 1) whereby the operator can rotate the drum and thus move the surface 6 to any position desired along the length of the rods 18.

The surface 7 is supported on slide rods 30 by rings or loops 31 in the same manner as surface 6. The rods 30, however, are secured transversely across the lower portion of the body 12. The ends of these rods are held by members 32 from the ends of which guy wires 33 and 34 extend to the upper and lower parts of the machine. The surface 7 is moved to any desired position on the rods by means of a cable 35 roved on a drum 36 which is mounted on a hollow shaft 37 concentric with shaft 26 and having a hand-wheel 38 convenient for the operator. The cable 35 passes from the drum back to a pair of guide pulleys 39 and 40 (Fig. 4) over the center of the surface from which the cable passes to the opposite margins of the surface where it is secured as indicated at 41. The drums 25 and 36 and the pulleys 39 and 40 are shown of unlike diameters for clearness of illustration.

It is readily seen that by turning the hand-wheel in either direction the surface 7 is shifted toward either the right or the left of the machine as desired, while by the adjacent handwheel 27 the surface 6 may be moved toward or from the center of the machine. By the operation of these two surfaces the machine is maintained in both longitudinal and lateral equipoise. When the machine tends to lean either forward or backward at an unfavorable inclination the surface 6 is moved toward the front or rear, according as more or less lifting effect is required at the forward part of the machine, and when either side of the machine unduly descends the surface 7 is shifted toward the lower side until the greater lifting thus produced on that side gives the desired effect.

Since the movable surface 6 can be used to tilt the machine it is adapted for the same functions as a horizontal rudder, in which capacity it possesses the advantage of presenting always a suitable and nearly uniform inclination to the wind. The surface 1 is so mounted, however, that it also may be used as a horizontal rudder if desired.

The lower portion of the machine is inclosed by a stout marginal framing member 51 to which are connected several pairs of flexible curved members 52, 53, 54, 55 and 56 extending downward from the body and to which are also connected the front and rear pairs of wheels 57 and 58. Within the framing 51 there is a doubly concave or dome-shaped lifting surface 60 raised at the front for effective action on the air. The surface 60 is formed of strakes and transverse members suitably arranged for the requisite shape and covered with two layers of air-tight and waterproof fabric the upper of which layers is attached to the entire framework of the surface. The under layer 61, however, is attached only at its edges to the framework 51 and can therefore be brought firmly against the upper layer 60 by air or water pressure or may be caused to take a convex form as shown in Fig. 1. The means for raising and lowering this fabric 61 is shown in Figs. 5 to 9. In Fig. 5 the fabric is shown in its fully distended position where it is maintained by the pump 63 in which the valved plunger 64 drives air through pipe 65, valve 66 and pipe 67 Fig. 6 to the space between the two fabrics. The air is taken from the open atmosphere but is led to the pump through the pipe 68 from a longitudinal recess 69 in the valve 66. To distend the surface the valve 66 is set in the position shown in Fig. 6 and the pump is thrown into engagement with the motor used for propelling the machine by a friction clutch 70 under control of the operator by a lever 71. When the distension is complete the clutch is disengaged and the air is confined by the check valve 72 and also by moving the valve 66 to the position shown in Fig. 8. In this condition the distended bottom of the machine has the necessary form and buoyancy to adapt it to gliding or skimming over the surface of water or resting thereon. When it is desired to withdraw the air and return the lower fabric 61 to its previous concave form in contact with the upper fabric to form an air impact and supporting surface the valve 66 is turned as shown in Fig. 7 and the pump again started. The air is now drawn to the pump from the pipe 67 through the valve 66, into pipe 68 and through check valve 73 and discharged into the open atmosphere by way of pipe 65 and the recess 69 of the valve 66. This action of the pump exhausts the air from between the two fabrics and holds them together smoothly as one until it is desired again to distend the lower one for use on the water as before described. For operating the valve 66 a lever 74 is provided on it and placed in control of the operator by cords or wires 75. A relief valve 76 is provided in case of undue pressure of the air between the fabrics.

Fig. 10 shows an alternate construction for the distensible lower portion of the machine. Here the upper part 60 is a fabric-covered framing as before, but the lower part, instead of being a simple fabric, is of framing or other stiff construction and is joined to the upper portion on all sides by an elastic plaited fabric or webbing 79. By whatever construction the distensible lower part may be formed, it is intended that it shall have, when distended, a broad and comparatively flat surface of contact with the water to insure that it shall glide or skim over the surface of the water without sinking to sufficient depth to make it difficult to rise from the water.

The wheels 57 are secured to the machine by levers 82 pivoted near their mid-length and held against backward deflection by stops or chocks 83 on the marginal framing 51. These levers are provided with lines 84 and 85 which pass over pulleys 86 to a cleat convenient to the operator. The line 85 holds the wheel levers secure against the chocks for land or air travel and when alighting on the water the wheels are raised to the position shown by dotted lines in Fig. 1 by drawing in line 84 and paying out line 85.

The machine is driven by a propeller 87 connected with a motor mounted inside the body portion of the machine. The vertical steering is accomplished in the manner already indicated in connection with surface 6, or by surface 1 acting as a horizontal rudder, while the horizontal steering is effected by the vertical rudder 88 controlled by the operator by cable mechanism in the ordinary manner which it is not necessary to show on the drawings. The operator's seat is placed in the forward part of the body of the machine where a portion of the body fabric is removed to afford him entrance and for look-out in travel.

What I claim is—

1. In a flying machine, a rearwardly ascending series of supporting surfaces in which the intermediate surfaces have greater transverse dimensions than the front and rear surfaces.

2. In a flying machine, a rearwardly ascending series of supporting surfaces in which the transverse dimensions of the surfaces diminish progressively from the central member of the series to the front and rear.

3. In a flying machine, a rearwardly ascending series of supporting surfaces in which the intermediate surfaces have greater transverse dimensions than the front and rear surfaces, the foremost surface of the series being of less transverse dimensions than the rearmost surface.

4. In a flying machine, in combination, a body portion formed of a pair of triangular truss frames joined at their lower edges and diverging upward and a rearwardly ascending series of lifting surfaces secured to said truss frames, the intermediate surfaces in said series having greater transverse dimensions than the front and rear surfaces.

5. In a flying machine, in combination, a body portion formed of a pair of triangular truss frames joined at their lower edges and diverging upward and a rearwardly ascending series of lifting surfaces secured to said truss frames, the transverse dimensions of the surfaces in said series diminishing progressively from the central member of the series to the front and rear.

6. In a flying machine, in combination, a body portion formed of a pair of triangular truss frames joined at their lower edges and diverging upward and a rearwardly ascending series of lifting surfaces secured to said truss frames, the intermediate surfaces in said series having greater transverse dimensions than the front and rear surfaces, and the foremost surface of the series being of less transverse dimensions than the rearmost surface.

7. In a flying machine, in combination, a body portion formed of a pair of triangular truss frames joined at their lower edges and diverging upward, a rearwardly ascending series of lifting surfaces secured to the said truss frames, the intermediate surfaces in said series having greater transverse dimensions than the front and rear surfaces, and other lifting surfaces extending from the sides of the body portion.

8. In a flying machine, in combination, a pair of longitudinal slides, a lifting surface mounted thereon, a pair of transverse slides, a lifting surface mounted thereon and concentrically arranged controlling means for shifting said surfaces on their slides.

9. In a flying machine, in combination, a pair of longitudinal slides, a lifting surface mounted thereon, a pair of transverse slides, a lifting surface mounted thereon and controlling means for shifting said surfaces on their slides, said controlling means comprising concentric shafts, a drum and hand-wheel on each shaft and cable connections between said drums and the surfaces.

10. In a flying machine, in combination, a distensible and collapsible element adapted to impinge with a concave surface upon the air and with a surface distended to convex form upon the water and means for convexly distending and concavely collapsing said element.

11. In a flying machine, in combination, a distensible and collapsible element adapted to impinge with a concave surface upon the air and with a surface distended to convex form upon the water and means for convexly distending and concavely collapsing said element.

12. In a flying machine, in combination, a distensible and collapsible element adapted to impinge with a concave surface upon the air and with a surface distended to convex form upon the water, an air-pump connected therewith and pipe and valve connections with the air-pump whereby air may be forced into or out from said element.

13. In a flying machine, in combination, a distensible and collapsible element adapted to impinge with a concave surface upon the air and with a surface distended to convex form upon the water and means for convexly distending and concavely collapsing said element, said means comprising an air-pump, an engine connected therewith, pipe and valve connections between the pump and the element and a clutch mechanism between the engine and the air-pump.

14. The combination with the lower portion of a flying machine of a convexly distensible and concavely collapsible element adapted to impinge with a concave surface upon the air and to glide or skim with a convex surface over the water, wheels for land travel and means for elevating the wheels out of contact with the water.

Witness my hand this eighteenth day of December, 1909.

CHRISTOPHER J. LAKE.

Witnesses:
C. E. ADAMS,
M. D. BLONDEL.